United States Patent [19]

Venkataswamy et al.

[11] Patent Number: 5,523,350

[45] Date of Patent: Jun. 4, 1996

[54] THERMOPLASTIC ELASTOMER COMPOSITIONS VULCANIZED WITH EPOXIDIZED OILS

[75] Inventors: Krishna Venkataswamy; Donald S. T. Wang, both of Akron, Ohio

[73] Assignee: Advanced Elastomer Systems, L.P., Akron, Ohio

[21] Appl. No.: 408,771

[22] Filed: Mar. 23, 1995

[51] Int. Cl.$^6$ ........................................................ C08F 8/00
[52] U.S. Cl. ...................... 525/109; 515/111; 515/167.5; 515/170; 515/329.7; 515/330.1; 515/330.3; 515/330.6; 515/385
[58] Field of Search .................................. 525/109, 111, 525/329.7, 330.1, 330.3, 330.6, 167.5, 170

[56] References Cited

U.S. PATENT DOCUMENTS

| | | | |
|---|---|---|---|
| 4,327,199 | 4/1982 | Coran et al. | |
| 4,753,975 | 6/1988 | Vanderkooi, Jr. | 525/176 |
| 4,782,110 | 11/1988 | Wolfe, Jr. | |
| 4,820,774 | 4/1989 | Takao et al. | |
| 4,871,810 | 10/1989 | Saltman | |
| 5,300,573 | 4/1994 | Patel | 525/109 |

FOREIGN PATENT DOCUMENTS

| | | |
|---|---|---|
| 0337977B1 | 10/1989 | European Pat. Off. |
| 0337976A2 | 10/1989 | European Pat. Off. |

*Primary Examiner*—Bernard Lipman
*Attorney, Agent, or Firm*—Daniel J. Hudak; William A. Skinner

[57] ABSTRACT

The thermoplastic elastomer compositions contain a continuous phase or matrix of an engineering thermoplastic such as ester polymer and a discontinuous phase of an acrylic rubber which is cured substantially by using epoxidized oils. The cured composition which can be dynamically vulcanized has good physical properties such as tensile strength, elongation, and high temperature resistance.

15 Claims, No Drawings

THERMOPLASTIC ELASTOMER COMPOSITIONS VULCANIZED WITH EPOXIDIZED OILS

FIELD OF INVENTION

The present invention relates to thermoplastic elastomers which are cured with environmentally friendly epoxidized oil curing agents, preferably by dynamic vulcanization. More specifically, the present invention relates to a composition of a thermoplastic polymer and acrylic rubber which are cured with epoxidized oils such as oils of fatty acids.

BACKGROUND OF THE INVENTION

Heretofore, thermoplastic elastomer compositions containing acrylate rubber were cured utilizing polyfunctional, i.e., at least difunctional, crosslinking agents either by covalent or ionic bonding through the functional groups of the curing agent. Typical curatives included various maleimide curatives which are desirably used if the composition contains ultraviolet light stabilizers, various organic peroxides, various urethane resins, various polyols such as pentaerythritol or diols such as bisphenol-A, various polyamines such as diamines, various polyisocyanates, magnesium oxide, and epoxides such as the diglycidyl ethers of bisphenol-A. The epoxides are external epoxides inasmuch as the oxirane group is located at the very end of the molecule chain. That is, the bridging oxygen atom is bonded to the end or last as well as to the second last carbon atom of the chain. Often such curatives had a disagreeable odor or were undesirable due to environmental reasons.

SUMMARY OF THE INVENTION

Thermoplastic elastomer compositions are made utilizing epoxidized oil curing agents preferably in the absence of any heretofore conventional curing agents such as those set forth above in the Background Of The Invention. The epoxidized oils need only contain a small amount of internal oxirane rings which open up and react with the rubber. A preferred method of preparation is dynamic vulcanization wherein at least one elastomer or rubber and the epoxidized oil curing agent are vulcanized in the presence of high shear and a thermoplastic so that the rubber compound is not only cured but also dispersed through a continuous thermoplastic phase. Cocurative metal salts of fatty acids are desirably also utilized.

DETAILED DESCRIPTION OF THE INVENTION

Generally, any type of acrylic rubber can be utilized in the present invention such as the various acrylates wherein the ester portion has from 1 to 10 carbon atoms with from 1 to 3 carbon atoms being desired. Specific examples include polymers of ethyl acrylate, butyl acrylate, ethyl-hexyl acrylate, and the like. Another class of suitable acrylic rubbers include various copolymers of ethylenically unsaturated carboxylic acids having from 3 to 10 carbon atoms in an amount of from about 0.1 to about 25 mole percent with from about 75 to about 99.9 mole percent of one or more of the above-noted acrylates. Still another class of suitable acrylic rubbers include copolymers of ethylene and the above noted acrylates wherein the amount of ethylene is high so as to produce a rubber having polar and non-polar portions, e.g., from about 10 to about 90 mole percent, desirably from about 30 to about 70 mole percent, and preferably from about 40 to about 60 mole percent of ethylene based upon the total weight of the copolymer. Still another class of desired acrylic rubbers are various terpolymers of ethylene, acrylate, and unsaturated carboxylic acids having from 3 to 10 carbon atoms. Desirably, the acid is acrylic acid or methacrylic acid. Such terpolymers are generally preferred and contain at least 50 mole percent of ethylene, generally from about 0.5 to about 10 mole percent and generally from about 2 to about 8 mole percent of the acid, and desirably from about 10 or to about 49.5 mole percent and desirably from about 20 or 30 to about 48 mole percent of the alkyl acrylate. The copolymers and terpolymers can be random or block. A specific commercially available compound is Vamac G, manufactured by DuPont, which generally has about 50 mole percent ethylene, about 45 mole percent of methyl acrylate and about 5 mole percent of acrylic acid.

Generally, any engineering thermoplastic polymer can be utilized which is compatible with the acrylic rubber. Suitable thermoplastic polymers include the various ester polymers such as polyester, copolyester, or polycarbonate, etc., a monofunctional epoxy endcapped derivative thereof, and mixtures thereof. The various polyesters can be either aromatic or aliphatic or combinations thereof and are generally directly or indirectly derived from the reactions of diols such as glycols having a total of from 2 to 6 carbon atoms and desirably from about 2 to about 4 carbon atoms with aliphatic acids having a total of from 2 to 20 carbon atoms and desirably from about 3 to about 15 or aromatic acids having a total of from about 8 to about 15 carbon atoms. Generally, aromatic polyesters are preferred such as polyethyleneterephthalate, polybutyleneterephthalate, polyethyleneisophthalate, polynaphthaleneterephthalate, and the like, as well as endcapped epoxy derivative thereof, e.g., a monofunctional epoxy polybutyleneterephthalate. Various polycarbonates can also be utilized and the same are esters of carbonic acid. A suitable polycarbonate is that based on bisphenol A, i.e., poly(carbonyldioxyl,4- phenyleneisopropylidene-1,4-phenylene).

The various ester polymers also include block polyesters such as those containing at least one block of a polyester and at least one rubbery block such as a polyether derived from glycols having from 2 to 6 carbon atoms, e.g., polyethylene glycol, or from alkylene oxides having from 2 to 6 carbon atoms. A preferred block polyester is polybutyleneterephthalate-b-polyethylene glycol which is available as Hytrel from DuPont The amount of the one or more engineering thermoplastics such as polyester is generally from about 10 to about 90 parts by weight, desirably from about 20 to about 80 parts by weight and preferably from about 30 to about 70 parts by weight per 100 parts by weight (PHR) of the acrylic rubber. Generally, amounts of the engineering plastic in excess of 75 PHR are not desired inasmuch as impact modified plastics are otherwise produced, that is, a composition having a high Shore D value, for example, above 50.

The curatives of the present invention are epoxidized oils. That is, oils which often, but not always contain at least two internal oxirane groups and typically, but not always, contain some unsaturation. By the term "internal" it is meant that the oxirane group is not bonded to the terminal or end carbon atom of the oil molecule and often is not in part bonded to either of the two end carbon atoms of each terminal portion of the oil molecule. Upon heating the rings open and react with the acrylic rubber to crosslink or cure the same. The epoxidized oils are generally known to the art and to the literature and are generally derived from plants such as vegetables, animals, or petroleum. The oils are generally saturated fatty acids and/or preferably unsaturated fatty acids. The epoxidized oils also include glycerides of various fatty acids such as linseed oil, which is a glyceride of linolenic, oleic, and linoleic unsaturated acids, and saturated fatty acids. The various fatty acids generally contain from about 10 to about 25 carbon atoms and more desirably from about 14 to about 21 carbon atoms.

Generally, the iodine value of the epoxidized oils are from about 0.5 to about 12, and desirably from about 1 to about 3, or 5, or 9. The weight of the oxirane groups in the oil can vary over a wide range such as from about only 1 or 2 percent, more desirably 3 or 4 percent by weight to about 10, 12, or even 15 percent by weight. Typical examples of suitable epoxidized oils are set forth in Table III.

The amount of the epoxidized oil can vary over a wide range depending upon the number of oxirane groups therein and the desired extent of crosslinking of the acrylic rubber. Generally, suitable properties are obtained utilizing from about 0.5 to about 20 parts by weight and desirably from about 1 to about 10 parts by weight of the epoxidized oils for 100 parts by weight of the acrylic rubber. In addition to having a pleasing odor, as well as being environmentally friendly, the epoxidized oils of the present invention have high flash points, generally well above the melting temperature of the thermoplastics at which temperature vulcanization is generally conducted. Such flash points are generally at least 20° F. (11° C.) and desirably at least 30° F. (18° C.) above the melting point of the thermoplastic which melting point is often at least 275° F. (135° C.).

Unlike acrylate systems which heretofore require the utilization of known or conventional crosslinking agents, the present invention does not require the same and can be cured substantially or completely in the absence of, i.e., free of, any such crosslinking agents. That is, the blends of the present invention generally contain less than 40, 25 or 10 mole percent, desirably less than 5 mole percent, and preferably less than 2 mole percent of any conventional cross-linking agent (i.e., other than the epoxidized oil) based upon 100 mole percent of all of the crosslinking agents, including the epoxidized oils, and even nil, that is, completely free of such conventional crosslinking agents. Conversely, the total amount of crosslinking agents contain at least 60, 75, or 90 mole percent, desirably at least 95 mole percent, and preferably at least 98 mole percent and even 100 mole percent mole percent of said epoxidized oils. The crosslinking agents which can be utilized in small amounts but desirable are avoided are set forth in the Background Of The Invention, e.g., the various polyamides, the various polyamines, the various polyisocyanates, the various epoxides such as diglycidyl ether of bisphenol A, magnesium oxide, and the like. The epoxides are distinguished from the epoxidized oils of the present invention inasmuch as noted above, their epoxide or oxirane groups are external, that is, located on at least the last carbon atom of the molecule in distinct contrast to the present invention wherein the oxirane group is internally located in the chain molecule. Upon reacting the epoxidized oils are reacted with the acrylic rubbers, the rubbers are crosslinked. According to the concepts of the present invention, generally at least 60 percent, desirably at least 70 or 80 percent, and preferably at least 90, 95, or 98 percent by weight and more preferably at least 100 percent by weight, i.e., all, of the crosslink sites in the acrylic rubber, are derived from internal oxirane compounds, i.e., epoxidized oils.

Although the epoxidized oil curing agents of the present invention can be utilized alone, they generally are slow reacting and thus are desirably utilized with an accelerator or cocurative such as a metal salt of a fatty acid having from about 12 or 14 to about 20 or 25 carbon atoms. Suitable cocuratives or accelerators include salts of fatty acids. Suitable cations include the alkaline as well as the alkaline earth metals, that is, Groups 1A and 2A of the Periodic Table, as well as the various transitional metals, for example, Groups 1B and 2B of the Periodic Table. Specific examples of accelerators include the sodium, potassium, magnesium, calcium, zinc, etc. salts of fatty acids such as palmitic acid, stearic acid, oleic acid, and the like, and mixtures thereof with potassium stearate being preferred. The amount of such cocuratives is generally from about 0.5 to about 10, desirably from about 1 to about 6 parts and preferably from about 2 to about 4 parts by weight per 100 parts by weight of acrylic rubber. Generally, the degree of cure of the acrylic rubber is such that at least 60 percent, desirably at least 80 percent, and preferably at least 90 percent or 95 percent by weight of the rubber does not dissolve in toluene or tetrahydrofuran at 23° C. In other words, after curing, the amount of extractable rubber under such conditions is less than 40 percent, desirably less than 20 percent, and preferably less than 10 percent or 5 percent by weight.

The compositions of the present invention can also contain various additives in conventional or suitable amounts. For example, various retardants can be utilized to prevent an unduly quick cure such as any quaternary ammonium salt. Other additives include various antioxidants, various ultraviolet light stabilizers such as various hindered amines, various processing aids, various colorants or pigments, various reinforcing agents or fillers such as clay, silica, carbon black, talc, and the like, various flame retardants, and various plasticizers such as the nonreactive sulfonamides and trimallitates.

The acrylic rubber thermoplastic composition of the present invention desirably is cured via dynamic vulcanization. Dynamic vulcanization means vulcanizing the acrylate rubber of the composition of the present invention under high shear and at vulcanizing temperatures. As a result, the rubber is generally simultaneously crosslinked and dispersed as fine particles of a "microgel" within the thermoplastic, e.g., polyester, matrix. Sources of high shear include Brabender mixers, Banbury mixers, extruders including twin screw extruders, and the like. A unique characteristic of the composition of the present invention is that while the elastomer rubber portion is crosslinked, the compositions nevertheless can be processed and reprocessed by conventional thermoplastic processing techniques and equipment such as extrusion, injection molding, compression molding and the like. An advantage of the thermoplastic elastomers of the present invention is that flashing, scrap, etc., can be salvaged and reprocessed.

The thermoplastic elastomers of the present invention have good physical properties such as tensile strength, elongation, as well as high temperature resistance. Moreover, the thermoplastic elastomers also have good retention of physical properties after high heat aging.

Suitable uses include molded, extruded or shaped articles useful as vehicle (for example, automotive) parts such as seals, tubings, hoses, gaskets, diaphragms, bellows, and the like.

The exact method of dynamic vulcanization can vary, but generally the acrylic rubber, various antioxidants, and the thermoplastic are added to a high shear mixing device such as a Brabender and the composition heated to a temperature above the melting point of the thermoplastic and mixed.

Subsequently, a retardant can be added along with the cocurative, e.g., potassium stearate, and the composition mixed until a homogeneous mixture is obtained. The mixing temperature is generally from about 220° C. to about 280° C., and desirably from about 220° C. to about 260° C. Subsequently, the epoxidized oil curing agent is added to the composition and mixed until the torque curve levels off at which time the composition is mixed for an additional short period of time, for example, two or three minutes. After mixing and curing, the thermoplastic elastomer compositions were removed from the Brabender mixer and cold pressed into a pancake and subsequently compression molded into plaques for testing.

The invention will be better understood by reference to the following examples which serve to illustrate but not to limit the scope of the present invention.

EXAMPLES

Polybutyleneterephthalate/ethylene acrylate-acid compositions were prepared according to the recipe set forth in Table I.

TABLE I

Epoxidized Soya Bean Oil Cure - PBT/Vamac System:

| Material | 1 | 2 | 3 | 4 | 5 | 6 |
|---|---|---|---|---|---|---|
| PBT 1600 A[1] | 66.6 | 66.6 | 66.6 | 66.6 | 66.6 | 66.6 |
| Vamac-G[2] | 100 | 100 | 100 | 100 | 100 | 100 |
| S-4[3] | 0.09 | 0.09 | 0.09 | 0.09 | 0.09 | 0.09 |
| Kemamide S-221[4] | 2.0 | 2.0 | 2.0 | 2.0 | 2.0 | 2.0 |
| Hytemp NPC-50[5] | 6.0 | 6.0 | 6.0 | 6.0 | 6.0 | 6.0 |
| K Stearate | 4.0 | 4.0 | 4.0 | 4.0 | 4.0 | 4.0 |
| Paraplex G-62 | 0 | 2 | 3 | 4 | 8 | 16 |

[1]Polybutyleneterephthalate from American Hoechst.
[2]Ethylene-acrylate-acid terpolymer from DuPont.
[3]An antioxidant mixture of Topanol CA, BLDPP, and calcium stearate, 1/1/0.5.
[4]A wax type lubricant from Witco.
[5]A masterbatch of a quaternary ammonium salt in acrylic rubber from Nippon Zeon.

The above recipes were dynamically vulcanized as follows:

The compositions were prepared using a Brabender/plasticorder with 60 cc mixing volume. The temperature was set at 225° C. and mixing was at 100 ppm. Ethylene-acrylate-acid rubber was mixed with the S-4 and the PBT. After the PBT was melted and the mixture became homogeneous, Kenamide S-221 (processing agent) was added. Potassium stearate and quaternary salts were then melt mixed. Subsequently, the epoxidized oil, e.g., paraplex G-62 was added. Mixing was continued till the rheometer torque curve levelled off.

Mixing was continued for two additional minutes.

The dynamic vulcanized compounds were pressed into a pancake and compression molded into plaques. Various physical tests were conducted and the physical properties obtained are set forth in Table II. The same tests, e.g., ASTM, were also used in Tables V, VII, and IX.

TABLE II

Initial Physical Properties

| Property | 1 | 2 | 3 | 4 | 5 | 6 |
|---|---|---|---|---|---|---|
| UTS (MPa) | 1.05 | 8.63 | 8.56 | 14.97 | 20.60 | 20.67 |
| Ultimate Tensile Strength ASTM D 412 in psi | 152 | 1251 | 1241 | 2170 | 2990 | 3000 |
| % Elongation ASTM D 412 | 1237 | 143 | 143 | 190 | 195 | 170 |
| 100% Modulus (MPa) | 1.03 | 7.32 | 7.52 | 10.39 | 12.78 | 13.15 |
| ASTM D 412 in psi | 149 | 1060 | 1090 | 1506 | 1853 | 1906 |
| Ten. Set (after 10 sec.), % ASTM D 412 | 41 | 31 | 30 | 27 | 27.5 | 25.5 |
| Hardness Shore A | 50 | 88 | 85 | 92 | 89 | 90 |
| Shore D ASTM D 2240 | — | — | — | 35 | 34 | 34 |

As apparent from Table II, Example 1 which did not contain any epoxidized oil generally yielded poor uncured physical properties. However, Examples 2 through 6 which contained various amounts of an epoxidized soya bean oil having an oxirane content of approximately 7.5 percent by weight, yielded very suitable properties such as high ultimate tensile strength, elongation and high 100 percent modulus. Additional compositions were made utilizing different epoxidized oils in amounts as set forth in Table III.

TABLE III

Type of Epoxidized Oils (Plasticizers)

| Trade Name | Chemical Name | Iodine Value | % Oxirane | Mol. wt. | Flash Pt. °F. |
|---|---|---|---|---|---|
| Paraplex G-60[1] | Epoxy Soya | 9.0 | 7.5 | 1000 | 310 |
| Paraplex G-62[1] | Bean Oil | 0.9 | 7.5 | 1000 | 310 |
| Plasthall ESO[2] | Bean Oil | 1.5 | 7.5 | 1000 | 310 |
| Paraplex G-64[1] | Linseed | 4.2 | 9.3 | — | 282 |
| Monoplex S-73[3] | Tallate | 1.5 | 5.5 | 420 | 224 |
| Monoplex S-75[3] | Stearate | 1.3 | 4.8 | 420 | 295 |
| Drapex 4.4[4] | Tall Oil | 2.5 | 5.0 | 420 | 220 |
| Drapex 6.8[4] | Soya Bean | 2.0 | 7.0 | 1000 | 290 |
| Drapex 10.4[4] | Linseed | 2.5 | 9.3 | 1000 | 290 |

[1]Manufactured by C. P. Hall Co.
[2]Manufactured by C. P. Hall Co.
[3]Manufactured by C. P. Hall Co.
[4]Manufactured by C. P. Hall Co.

In a manner similar to that set forth hereinabove with respect to Table I, the recipes of Examples 7–15 (Table IV) were dynamically cured and the physical properties thereof are set forth in Table V.

TABLE IV

DVAs of PBT and Vamac with Different Epoxy Oils

| Material | 7 | 8 | 9 | 10 | 11 | 12 | 13 | 14 | 15 |
|---|---|---|---|---|---|---|---|---|---|
| PBT 1600A | 66.6 | 66.6 | 66.6 | 66.6 | 66.6 | 66.6 | 66.6 | 66.6 | 66.6 |
| Vamac-G | 100 | 100 | 100 | 100 | 100 | 100 | 100 | 100 | 100 |
| S-4 | 0.09 | 0.09 | 0.09 | 0.09 | 0.09 | 0.09 | 0.09 | 0.09 | 0.09 |
| Kemamide S-221 | 2.0 | 2.0 | 2.0 | 2.0 | 2.0 | 2.0 | 2.0 | 2.0 | 2.0 |
| Hytemp NPC-50 | 6.0 | 6.0 | 6.0 | 6.0 | 6.0 | 6.0 | 6.0 | 6.0 | 6.0 |
| K Stearate | 4.0 | 4.0 | 4.0 | 4.0 | 4.0 | 4.0 | 4.0 | 4.0 | 4.0 |
| Paraplex G-62 | 8.0 | — | — | — | — | — | — | — | — |
| Paraplex G-60 | — | 8.0 | — | — | — | — | — | — | — |
| Plasthall ESO | — | — | 8.0 | — | — | — | — | — | — |
| Paraplex G-64 | — | — | — | 8.0 | — | — | — | — | — |
| Monoplex S-73 | — | — | — | — | 8.0 | — | — | — | — |
| Monoplex S-75 | — | — | — | — | — | 8.0 | — | — | — |
| Drapex 4.4 | — | — | — | — | — | — | 8.0 | — | — |
| Drapex 6.8 | — | — | — | — | — | — | — | 8.0 | — |
| Drapex 10.4 | — | — | — | — | — | — | — | — | 8.0 |

TABLE V

Initial Physical Properties

| Property | 7 | 8 | 9 | 10 | 11 | 12 | 13 | 14 | 15 |
|---|---|---|---|---|---|---|---|---|---|
| UTS, MPa | 21.10 | 18.60 | 20.10 | 22.0 | 9.67 | 11.2 | 20.5 | 20.8 | 21.7 |
| in Psi | 3060 | 2700 | 2910 | 3190 | 1402 | 1625 | 2970 | 3020 | 3146 |
| % | 210 | 185 | 200 | 170 | 170 | 154 | 200 | 210 | 180 |

TABLE V-continued

| | Initial Physical Properties | | | | | | | | |
|---|---|---|---|---|---|---|---|---|---|
| Property | 7 | 8 | 9 | 10 | 11 | 12 | 13 | 14 | 15 |
| Elongation 100% Modulus MPa | 12.0 | 12.2 | 12.1 | 14.4 | 7.6 | 8.73 | 12.3 | 11.9 | 13.9 |
| in Psi | 1740 | 1770 | 1754 | 2090 | 1100 | 1265 | 1780 | 1725 | 2015 |
| Ten Set % | 24 | 25 | 25 | 29 | 28 | 25 | 24 | 24 | 28.5 |
| Hardness | | | | | | | | | |
| Shore A | — | — | — | — | 87 | 88 | — | — | — |
| Shore D | 38 | 37 | 37 | 39 | — | — | 37 | 37 | 39 |

As apparent from Table V, generally regardless of the type of epoxidized oil used, good physical properties such as ultimate physical strength and 100 percent modulus were obtained.

Table VI sets forth the recipes of various compositions wherein different amounts of an epoxidized oil, that is a linseed oil, were utilized as well as low amounts of a polyester.

TABLE VI

| | PBT 1600A/Vamac DVA - Effect of Drapex 10.4 | | | | |
|---|---|---|---|---|---|
| Material | 16 | 17 | 18 | 19 | 20 |
| PBT 1600A | 33.3 | 33.3 | 33.3 | 33.3 | 33.3 |
| Vamac-G | 100 | 100 | 100 | 100 | 100 |
| S-4 | 0.09 | 0.09 | 0.09 | 0.09 | 100 |
| Kemamide S-221 | 2 | 2 | 2 | 2 | 2 |
| Hytemp NPC-50 | 6 | 6 | 6 | 6 | 6 |
| K Stearate | 4 | 4 | 4 | 4 | 4 |
| Drapex 10.4 | 0.5 | 1 | 2 | 3 | 4 |

When dynamically vulcanized in a manner as set forth with respect to Example 1, the following physical properties were obtained.

TABLE VII

| Property | 16 | 17 | 18 | 19 | 20 |
|---|---|---|---|---|---|
| UTS, MPa | 6.85 | 7.4 | 18.4 | 10.2 | 11.9 |
| in Psi | 993 | 1070 | 220 | 1480 | 1730 |
| % Elong. | 280 | 300 | 250 | 165 | 160 |
| 100% Modulus, MPa | 3.70 | 3.83 | 6.5 | 6.5 | 7.3 |
| in Psi | 540 | 555 | 942 | 942 | 1060 |
| Ten. Set. % | 27 | 29 | 19 | 14 | 12 |
| OS[1] (70 Hours, 177° C.) | 82 | 69 | 67 | 58 | 54 |
| Shore A | 67 | 76 | 75 | 80 | 78 |

[1]Oil swell is measured by weight gain.

Once again, overall good physical properties were obtained.

Table VIII sets forth additional recipes wherein different types of epoxidized oils were utilized with low amounts of the polybutyleneterephthalate.

TABLE VIII

| | PBT 1600A/Vamac DVA Effect of Drapex 10.4 | | | |
|---|---|---|---|---|
| Material | 21 | 22 | 23 | 24 |
| PBT 1600A | 33.3 | 33.3 | 33.3 | 33.3 |
| Vamac-G | 100 | 100 | 100 | 100 |
| S-4 | 0.09 | 0.09 | 0.09 | 0.09 |
| Kemamide S-221 | 2 | 2 | 2 | 2 |
| Hytemp NPC-50 | 6 | 6 | 6 | 6 |
| K Stearate | 4 | 4 | 4 | 4 |
| Drapex 10.4 | 1 | — | — | — |
| Paraplex G-64 | — | 1 | — | — |
| Paraplex G-62 | — | — | 1 | — |
| Monoplex S-75 | — | — | — | 2 |

The above recipe when dynamically vulcanized and tested yielded the following properties:

TABLE IX

| Property | 21 | 22 | 23 | 24 |
|---|---|---|---|---|
| UTS, MPa | 7.4 | 7.6 | 6.2 | 7.5 |
| in psi | 1070 | 1100 | 900 | 1090 |
| % Elongation | 240 | 250 | 270 | 250 |
| 100% Modulus, MPa | 4.1 | 4.0 | 3.3 | 4.3 |
| in psi | 590 | 580 | 480 | 620 |
| Ten Set, % | 21 | 24 | 19 | 20 |
| OS (70 H, 177 C.) | 67 | 73 | 90 | 81 |
| Shore A | 73 | 73 | 63 | 67 |

Even with low amounts of polybutyleneterephthalate, good physical properties were obtained.

While in accordance with the Patent Statutes, the best mode and preferred embodiment has been set forth, the scope of the invention is not limited thereto, but rather by the scope of the attached claims.

What is claimed is:

1. A thermoplastic elastomer composition, comprising:
   the reaction product of an acrylic rubber cured with an effective amount of an epoxidized oil wherein the oxirane groups are internally located in the molecule, and a coccurative comprising an alkaline, alkaline earth, or a transition metal salt of a fatty acid, so that at least 60 percent of the crosslink sites of said cured acrylic rubber are derived from said epoxidized oil, said rubber cured under shear in the presence of from about 10 parts to about 90 parts by weight of a compatible thermoplastic ester polymer per 100 parts by weight of said acrylic rubber.

2. A thermoplastic elastomer composition according to claim 1, wherein said acrylic rubber is an acrylate, an ethylene-acrylate copolymer, an acid-acrylate copolymer, an ethylene-acrylate-acid terpolymer, or combinations thereof.

3. A thermoplastic elastomer composition according to claim 1, wherein said ester polymer is a polyester, a copolyester, a polycarbonate, a block polyester polymer, or an epoxy endcapped derivative thereof, or combinations thereof, wherein the amount of said ester polymer is from about 20 parts to about 80 parts by weight per 100 parts by weight of said acrylic rubber, wherein at least 80 percent of said crosslinks are derived from said epoxidized oil, and wherein said epoxidized oil is derived from at least one fatty acid having from 10 to 25 carbon atoms.

4. A thermoplastic elastomer composition according to claim 3, wherein said acrylic rubber is said ethylene-acrylate-acid terpolymer, wherein at least 90 percent of said crosslinks are derived from said epoxidized oil, wherein said ester polymer is said polyester, and wherein the amount of said epoxidized oil is from about 0.5 to about 20 parts by weight per 100 parts by weight of said acrylic rubber.

5. A thermoplastic elastomer composition according to claim 4, wherein at least 95 percent of said crosslink sites are derived from said epoxidized oil, wherein the amount of ethylene in said terpolymer rubber is at least 50 mole percent, wherein the amount of said acid in said terpolymer rubber is from about 0.5 to about 10 mole percent, and wherein the amount of said acrylate in said terpolymer rubber is from about 10 to about 49.5 mole percent, wherein the ester portion of said acrylate contains from 1 to 3 carbon atoms, wherein said polyester is polyethyleneterephthalate, polybutyleneterephthalate, polyethyleneisophthalate, polynaphthaleneterephthalate, or an epoxy endcapped derivative thereof, or combinations thereof, wherein the amount of said polyester is from about 30 parts to about 70 parts by weight per 100 parts by weight of said terpolymer, and wherein said cocurative is a sodium, potassium, magnesium, calcium, or a zinc salt of a fatty acid having from 14 to 20 carbon atoms.

6. A thermoplastic elastomer composition according to claim 5, wherein the degree of cure of said acrylic rubber is at least 80 percent by weight in toluene or tetrahydrofuran.

7. A thermoplastic elastomer composition, comprising:
a blend of a cured acrylic rubber dispersed in a continuous compatible thermoplastic ester polymer phase, the amount of said thermoplastic ester polymer being from about 10 to about 90 parts by weight per 100 parts by weight of said acrylic rubber, said acrylic rubber cured by crosslinking agents which are substantially an epoxidized oil wherein the oxirane groups are internally located in the molecule, and a cocurative comprising an alkaline, alkaline earth, or a transition metal salt of a fatty acid.

8. A thermoplastic elastomer composition according to claim 7 wherein the amount of said epoxidized oil crosslinking agent is at least 60 mole percent based upon the total of all of said crosslinking agents.

9. A thermoplastic elastomer composition according to claim 8, wherein the amount of said epoxidized oil crosslinking agent is at least 75 mole percent, wherein the amount of said epoxidized oil is from about 1 to about 20 parts by weight per 100 parts by weight of said acrylic rubber, and wherein said acrylic rubber is an acrylate, an ethylene-acrylate copolymer, an acid-acrylate copolymer, an ethylene-acrylate-acid terpolymer, or combinations thereof.

10. A thermoplastic elastomer composition according to claim 9, wherein the amount of said epoxidized oil crosslinking agent is at least 95 mole percent, wherein said ester polymer is a polyester, and wherein the amount of said polyester is from about 20 parts to about 80 parts by weight per 100 parts by weight of said rubber.

11. A thermoplastic elastomer composition according to claim 10, wherein the amount of said epoxidized oil crosslinking agent is at least 98 mole percent, wherein said polyester is polyethyleneterephthalate, polybutyleneterephthalate, polyethyleneisophthalate, polynaphthaleneterephthalate, or an epoxy endcapped derivative thereof, or combinations thereof, wherein said acrylic rubber is said ethylene-acrylate-acid terpolymer, wherein the amount of ethylene in said terpolymer rubber is at least 50 mole percent, wherein the amount of said acid in said terpolymer rubber is from about 0.5 to about 10 mole percent, and wherein the amount of said acrylate in said terpolymer rubber is from about 10 to about 49.5 mole percent, wherein the ester portion of said acrylate contains from 1 to 3 carbon atoms, and wherein said cocurative is sodium, potassium, magnesium, calcium, or a zinc salt of a fatty acid having from 14 to 20 carbon atoms.

12. A thermoplastic elastomer composition according to claim 11, wherein the degree of cure of said acrylic rubber is at least 90 percent by weight in toluene or tetrahydrofuran.

13. A process, comprising the steps of dispersing an acrylic rubber in an ester polymer, and using epoxidized oil and a cocurative to cure said acrylic rubber, wherein the oxirane groups of the epoxidized oil are internally located in the molecue and wherein the cocurative comprises an alkaline, alkaline earth, or a transition metal salt of a fatty acid.

14. A process according to claim 13, wherein said acrylic rubber is an acrylate, an acid-acrylate copolymer, an ethylene-acrylate copolymer, an ethylene-acrylate-acid terpolymer, or combinations thereof, wherein said ester polymer is a polyester, a copolyester, a polycarbonate, a block polyester polymer, or an epoxy endcapped derivative thereof, or combinations thereof, and wherein the amount of said epoxidized oil is from about 0.5 to about 20 parts by weight per 100 parts by weight of said acrylic rubber.

15. A process according to claim 14, wherein said rubber is said ethylene-acrylate-acid terpolymer, wherein said polyester is polyethyleneterephthalate, polybutyleneterephthalate, polyethyleneisophthalate, polynaphthaleneterephtlalate, or an encapped derivative thereof, or combinations thereof, and wherein said epoxidized oil has from about 3 percent to about 12 percent by weight of oxirane groups therein.

* * * * *